(12) United States Patent
Chou

(10) Patent No.: US 6,780,266 B2
(45) Date of Patent: Aug. 24, 2004

(54) METHOD OF MAKING THE BASIC MATERIAL AND THE FACIAL SKIN OF SYNTHETIC LEATHER WITH ONE ROUND OF PROCESS

(76) Inventor: Lung Wen Chou, No. 20, Lane 256, Haiwei Rd., Lungjing Shiang, Taichung (TW), 434

(*) Notice: Subject to any disclaimer, the term of this patent is extended or adjusted under 35 U.S.C. 154(b) by 166 days.

(21) Appl. No.: 10/093,521

(22) Filed: Mar. 11, 2002

(65) Prior Publication Data

US 2003/0168765 A1 Sep. 11, 2003

(51) Int. Cl.[7] .............................................. B32B 31/00
(52) U.S. Cl. ..................... 156/78; 156/231; 156/235; 156/238; 156/246; 156/307.1; 156/555
(58) Field of Search ............................ 156/555, 77, 78, 156/209, 219, 230, 231, 235, 238, 241, 289, 307.1, 307.3, 310, 246, 243, 540; 428/105, 106

(56) References Cited

U.S. PATENT DOCUMENTS 3,330,713 A * 7/1967 Watson et al. .......... 156/244.17
3,607,522 A * 9/1971 Phillips et al. .............. 156/209
3,619,315 A * 11/1971 Carrack et al. ............... 156/77

* cited by examiner

Primary Examiner—Gladys J P Corcoran
(74) Attorney, Agent, or Firm—Troxell Law Office PLLC

(57) ABSTRACT

A method of making the basic material and the facial skin of synthetic leather with one round of process includes two units of material injecting devices for respectively making a PU plastic foam layer and a face-skin layer at the same time. The PU plastic foam layer and the face-skin layer are tightly combined together when they are in a condition of half reaction and not fully becoming hardened to finish making the synthetic leather with one round of process, achieving effects of shortening a producing process, saving equipment, labor and electricity, lowering producing cost, and preventing air and water pollution.

3 Claims, 4 Drawing Sheets

METHOD OF MAKING THE BASIC MATERIAL AND THE FACIAL SKIN OF SYNTHETIC LEATHER WITH ONE ROUND OF PROCESS

BACKGROUND OF THE INVENTION

This invention relates to a method of making the basic material and the facial skin of synthetic leather with one round of process, particularly to one applying one material injecting device to inject foaming plastic on a basic cloth, and another material injecting device injecting non-foaming plastic on a separable paper to form a facial skin, and then the basic cloth and the facial skin tightly combined together to make up synthetic leather when they are in a condition of half reaction and not fully becoming hardened.

Conventionally, to make synthetic leather, a basic material has to be made first. Usually, various materials and solvent are put into one or more saturating tanks, and basic cloth is guided to pass through and be saturated with the materials in the saturating tank, and then the basic cloth is guided into a water tank to let its surface gelatinized and solidified, and finally dried by an electric heat device to make up the basic material of synthetic leather. Further, a facial skin (skin membrane) has to be made, and then the basic material and the facial skin are tightly combined together by means of glue.

However, in making conventional synthetic leather, a large amount of solvent is used whether in making a basic material or a facial skin, possibly resulting in serious environmental pollution. For instance, the solvent used for making conventional moist-mode synthetic leather contains dimethyl formamide (DMF for short), which is easy to cause a person poisoned in case absorbed through skin or breathed in lungs, so it is supervised and restricted in using. According to regulations, the dimethyl formamide can only be used on condition that a factory is provided with devices for collecting poisonous gas, for washing with water and for processing exhaust, and is supervised and recorded by the factory and the government any time, thus taking much time and labor in dealing with the exhaust and waste water, and likely giving rise to serious pollution.

On the other hand, in making conventional dry-mode synthetic leather, a resin spreading way is used, and methyl ethyl ketone (MEK for short) has to be applied for this purpose. But this MEK is liable to cause a person acute hepatitis through breathing in its poisonous gas, and its xylene is high combustible to be ignited by heat, spark or flame, possible to bring forth a fire, and pollute air and water. Besides, the glue used for combination contains solvent, so it is also harmful and dangerous.

In addition, the basic material and the facial akin of conventional synthetic leather are made respectively in two factory premises, and then pressed and combined together by means of glue. And whether the basic material or the facial skin of the conventional synthetic leather has to be made with several rounds of process, and the material for each round of process has to deposited, so a factory premises with a large space is required. Besides, electric-heat drying device is needed for making the basic material and facial skin of conventional synthetic leather, thus wasting too much electricity and labor, and increasing producing cost.

SUMMARY OF THE INVENTION

One objective of the invention is to offer a method of making the basic material and the facial skin of synthetic leather with one round of process, using two units of material injecting devices respectively and synchronously to make a basic material with a polyurethane (PU) plastic foam layer and a face-skin layer, which are pressed and combined together, when they are in a condition of half reaction and not fully becoming hardened, saving space for respectively storing materials, shortening a producing process, economizing equipment and labor, and lowering producing cost.

Another objective of the invention is to offer a method of making the basic material and the facial skin of synthetic leather with one round of process, in which the basic material with PU plastic foam layer and the facial skin containing PU plastic ingredient are pressed and combined together during a condition of half reaction and not fully becoming hardened, thus ensuring the stability of their combination.

A third objective of the invention is to offer a method of making the basic material and the facial skin of synthetic leather with one round of process, in which no solvent is used, impossible to cause a fire, and pollute air and water, conforming to environmental protection.

One more objective of the invention is to offer a method of making the basic material and the facial skin of synthetic leather with one round of process, in which reaction-mode PU plastic is used, so the time of its hardening can be controlled according to the amount of the catalyst added in the hardening agent, needless to employ a conventional thermal bellows and possible to economize much electricity.

Still one more objective of the invention is to offer a method of making the basic material and the facial skin of synthetic leather with one round of process, possible to make up preset wrinkled grains of snake skin, hide or suede on the surface of the face-skin layer, enabling the synthetic leather to be used extensively.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
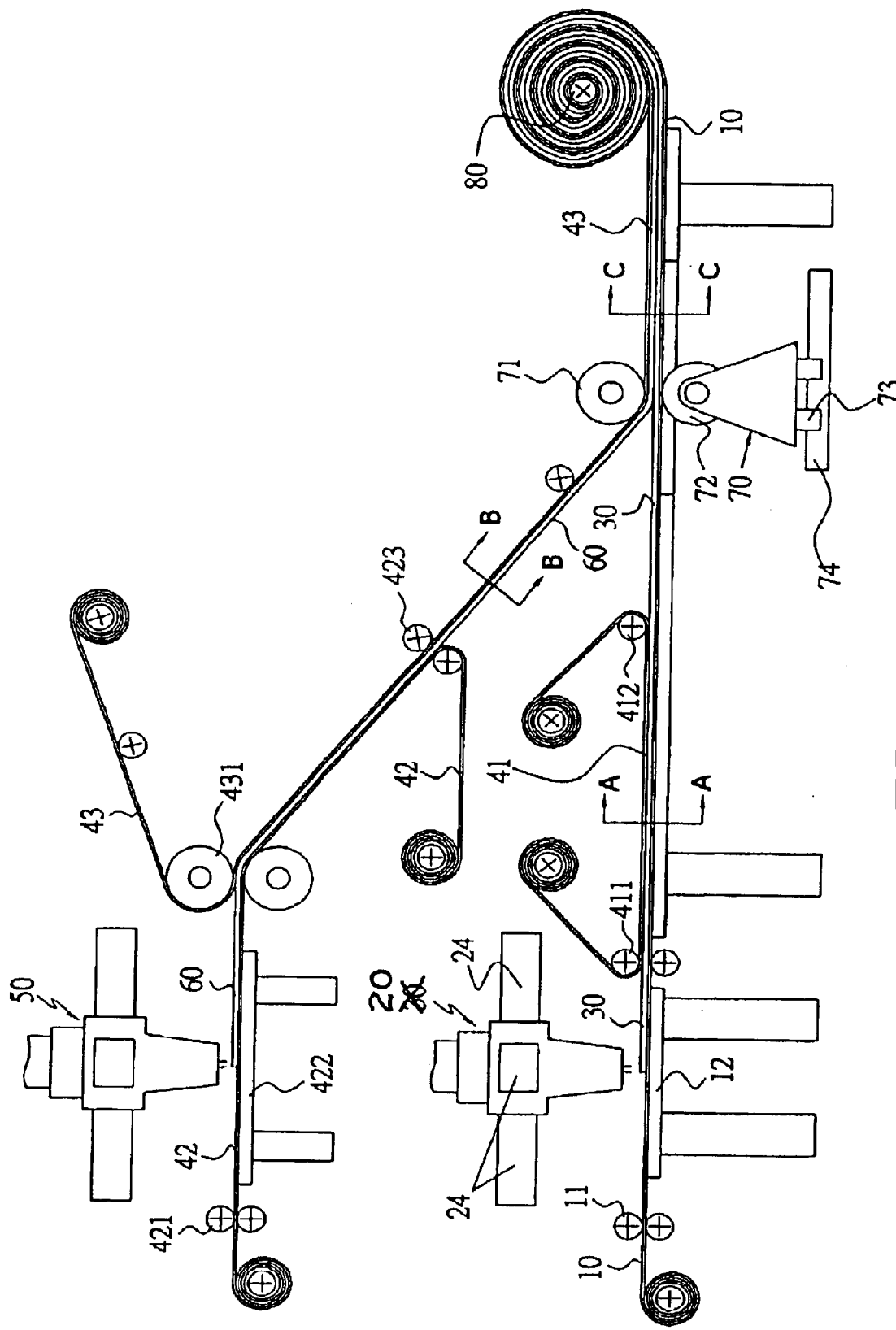
FIG. 1 is a side view of the process of making synthetic leather in the present invention.

A method of making the basic material and the facial skin of synthetic leather with one round of process in the present invention, as shown in FIG. 1, includes the following steps.

Firstly, a basic cloth 10 made of fabric, non-textile cloth, extra fine fiber or the like is conveyed to a preset direction by convey wheels 11, an upper roller 71, a lower roller 72 and a rolling device 80, all of which rotate synchronously to move the basic cloth forward along the surface of a work-bench 12.

Figure 2:
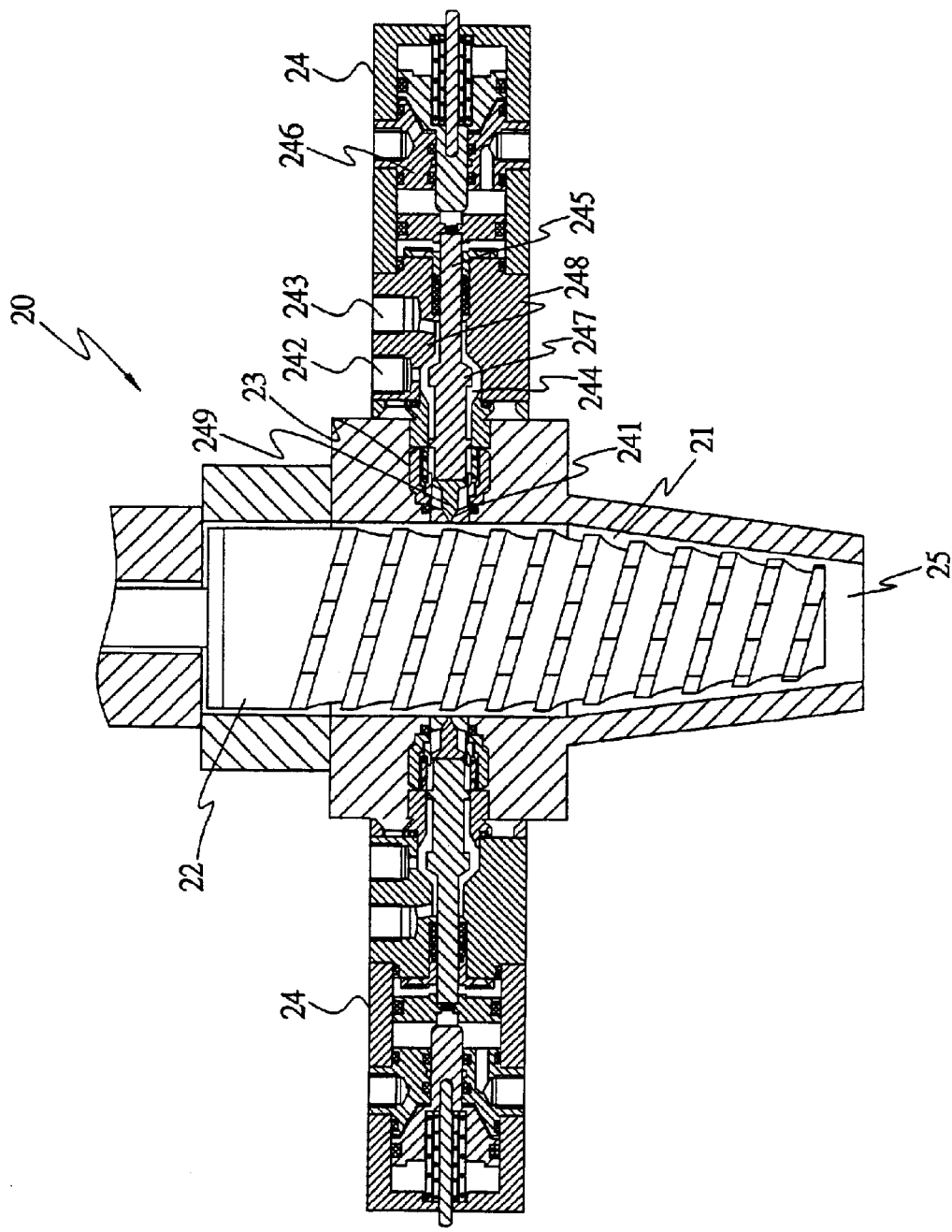
FIG. 2 is a cross-sectional view of a material intake device in the present invention.
Figure 3:
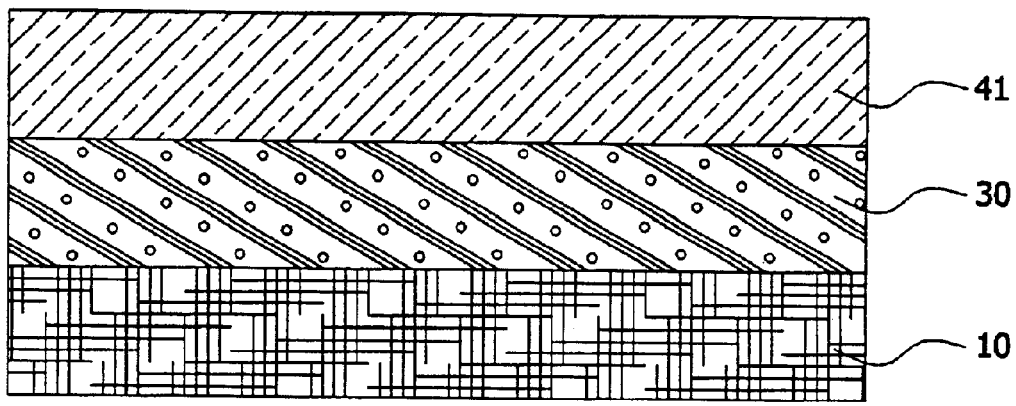
FIG. 3 is a cross-sectional view of the line A—A in FIG. 1.
Figure 4:
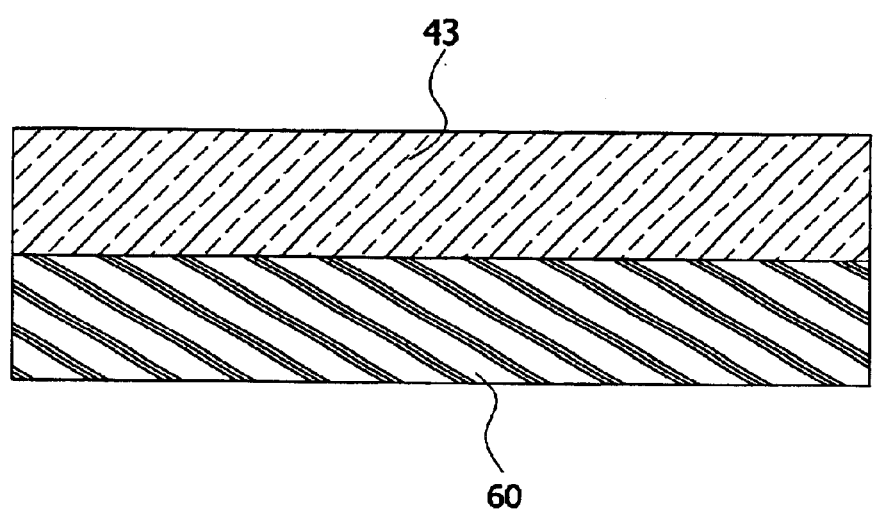
FIG. 4 is a cross-sectional view of the line B—B in FIG. 1.
Figure 5:
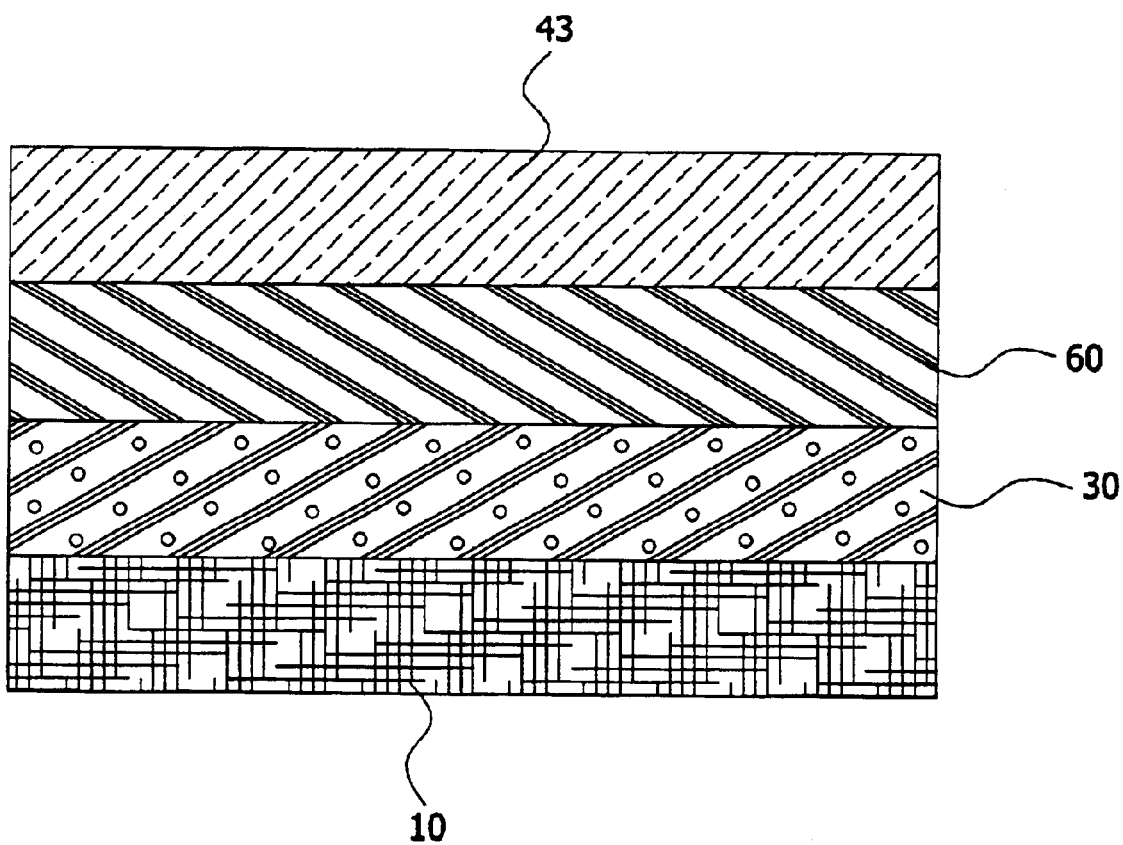
FIG. 5 is a cross-sectional view of the line C—C in FIG. 1.

Next, a first material injecting device 20 provided above the basic cloth 10 injects PU resin and foaming material on the surface of the basic cloth 10 to make up a basic material with PU plastic foam layer 30. The first material injecting device 20, as shown in FIG. 2, is formed with a vertical blending tank 21 in the center. The blending tank 21 has a rotatable helical rod 22 fitted inside and four lateral pivotal holes 23 respectively provided in four circumferential sides for receiving four material intake members 24. Each material intake member 24 is provided with a material injecting hole 241 in the front center, a material intake opening 242 on top, a flowing-back opening 243 at the right side of the material intake opening 242 and a chamber 244 inside. Further, the chamber 244 is fitted inside with a control rod 245 with its end connected with a piston 246.

When the control rod 245 is moved backward, the stop member 247 on the intermediate portion of the control rod 245 will engage the stop plate 248 of the material intake member 24, letting the chamber 244 isolated. At this time, the material stop needle 249 at the front end of the control rod 245 doesn't block the material injecting hole 241, letting the material injecting hole 241 opened. Thus, material can be poured into the material injecting hole 241 through the material intake opening 242, and then injected into the blending tank 21 through the material injecting hole 241, and subsequently projected out through a pouring opening 25.

On the contrary, when the control rod 245 is moved forward, the material stop needle 249 will block the material injecting hole 241, and the material will get into the chamber 244 through the material intake opening 241 and then get out through the flowing-back opening 243 and flow back into respective material barrel.

The first material injecting device 20 makes PU resin main agent, hardening agent, foaming agent and color material blended and then injects them on the surface of the basic cloth 10 to form a PU plastic form layer 30 which is again conveyed forward in a condition of reacting gradually.

Then, a first-layer separable paper 41 is pressed to stick tightly on the top surface of the PU plastic foam layer 30 by means of a roller 411 when the PU plastic foam layer 30 is reacting by degrees, and afterward the first-layer separable paper is peeled off by another roller 412 to make the surface of the PU plastic foam layer 30 flattened and become comparatively smooth.

Further, a second material injecting device 50 is deposited above a second-layer separable paper 42 for injecting PU plastic on the surface of the second-layer separable paper 42 to make up a face-skin layer 60. The second-layer separable paper 42 is conveyed forward on the surface of the workbench 422 by a roller 421, an upper roller 71, a lower roller 72 and a rolling device 80, which rotate at the same time. The second material injecting device 50 is the same as the first material injecting device 20 in structure, except that the material it uses includes only resin main agent, hardening agent and color material, with foaming agent excluded. Besides, the face-skin layer 60 is also conveyed forward when it is in a condition of reacting gradually.

After that, a third-layer separable paper 43 is pressed and pasted on the top surface of the face-skin layer 60 by a roller 431 during the process of gradual reaction. The third-layer separable paper 43 is formed with wrinkles like the grains of snakeskin, hide or suede.

The second-layer separable paper 42 under the face-skin layer 60 can be peeled off when it passes through the roller 423 and is rolled up.

The basic material with a PU plastic foam layer 30 and the face-skin layer 60 are moved through a rolling-pressing device 70 to be pressed and tightly combined together when they are in a condition of half reaction and not fully becoming hardened. The rolling-pressing device 70 consists of an upper roller 71 and a lower roller 72 connected to each other, with a gap between them adjustable to control the degree of their compression so as to regulate the thickness of the synthetic leather.

Furthermore, rollers 73 of a preset number are provided at the bottom of the rolling-pressing device 70, possible to slide along a guide rail 74 and be fixed with a proper way. Thus, the position of the rolling-pressing device 70 moving on the guide rail 74 can be adjusted to match with the degree of foaming of the material so as to select a most suitable time for pressing and closely combining the PU plastic foam layer 30 together with the face-skin layer 60.

Lastly, the PU plastic foam layer 30 and the face-skin layer 60 compressed and combined together are conveyed to a proper location to be rolled up by means of a rolling device 80.

As can be noted from the above description, this invention has the following characteristics.

1. The first material injecting device 20 deposited above the basic cloth 10 is applied to inject PU resin and foaming material on the surface of the basic cloth 10 to make up a basic material with a PU plastic foam layer 30, and at the same time the second material injecting device 50 positioned above the second-layer separable paper 42 is employed to inject non-foaming PU resin on the surface of the second-layer separable paper 42 to form a face-skin layer 60. Then, the PU plastic foam layer 30 and the face-skin layer 60 are pressed and combined together to finish making the basic material and the facial skin of the synthetic leather with one round of process when they are in a condition of half reaction and not fully becoming hardened.

Evidently, the invention can eliminate the defects of making a basic material and a facial skin respectively and wasting spaces for respectively depositing material as described in a conventional process of making synthetic leather, and has effects of shortening a producing process, saving equipment and labor, and lowering producing cost.

2. The basic material with a PU plastic layer 30 and the face-skin layer 60 having PU plastic ingredient to accepting each other are pressed and tightly combined together when they are in a condition of half reaction and not fully becoming hardened, ensuring stability of their combination.

3. No glue and no conventional solvent are used, accordingly having no possibility of causing a fire or polluting air and water, and thus conforming to environmental protection.

4. The face-skin layer 60 has its top surface closely stuck by the third-layer separable paper 43 with preset wrinkles, so its surface will be formed with grains of snakeskin, hide or suede after it is hardened, achieving an effect of extensive use.

5. Reaction-mode PU plastic is used for making synthetic leather, therefore the time of hardening of the foaming material can be controlled in accordance with the amount of the catalyst added in the hardening agent, needless to use a conventional thermal bellows and possible to economize much electricity.

While the preferred embodiment of the invention has been described above, it will be recognized and understood that various modifications may be made therein and the appended claims are intended to cover all such modifications that may fall within the spirit and scope of the invention.

I claim:

1. A method of making a basic material and a facial skin of synthetic leather comprising the following steps:

a) conveying a basic cloth in a preset direction, said basic cloth made of a material selected from the group consisting of fabric, non-textile cloth, and extra fine fiber;

b) injecting a polyurethane resin and foaming material on the surface of said basic cloth by a first material injecting device located above said basic cloth to form a basic material with a polyurethane plastic foam layer;

c) injecting a polyurethane plastic on a surface of a first separable paper by a second material injecting device positioned above the first separable paper to form a face-skin layer;

d) removing the first separable paper from the face-skin layer;

e) pressing and combining together said basic material with the polyurethane plastic foam layer and said face-skin layer when the polyurethane plastic foam layer and the face-skin layer are in a condition of half reaction and not fully hardened; and f) rolling said previously combined basic material and face-skin layer with a rolling device, wherein, after the step of injecting polyurethane plastic on said first separable paper, a second separable paper with preset wrinkles is pressed on a top surface of the face-skin layer.

2. The method of making the basic material and the facial skin of synthetic leather according to claim 1, wherein said basic material with the polyurethane plastic foam layer has a top surface with a third separable paper which, after said polyurethane plastic foam layer proceeds for a predetermined distance, is peeled off to make the top surface of said polyurethane plastic foam layer flattened.

3. A method of making a basic material and a facial skin of synthetic leather comprising the following steps:

a) conveying a basic cloth in a preset direction, said basic cloth made of a material selected from the group consisting of fabric, non-textile cloth, and extra fine fiber;

b) injecting a polyurethane resin and foaming material on a surface of said basic cloth by a first material injecting device located above said basic cloth to form a basic material with a polyurethane plastic foam layer;

c) injecting a polyurethane plastic on a surface of a first separable paper by a second material injecting device positioned above the first separable paper to form a face-skin layer;

d) removing the first separable paper from the face-skin layer;

e) pressing and combining together said basic material with the polyurethane plastic foam layer and said face-skin layer when the polyurethane plastic foam layer and the face-skin layer are in a condition of half reaction and not fully hardened; and f) rolling said previously combined basic material and face-skin layer with a rolling device, wherein said basic material with the polyruethane plastic foam layer and said face-skin layer are tightly combined together after they are moved through and compressed by a rolling-pressing device provided with rollers of a preset number at a bottom, wherein the rollers at the bottom allow the rolling-pressing device to slide on a guide rail and to be selectively fixed at a desired location on the guide rail.

\* \* \* \* \*